US008533045B1

(12) United States Patent
Cunningham et al.

(10) Patent No.: US 8,533,045 B1
(45) Date of Patent: Sep. 10, 2013

(54) UNIVERSAL COUPON REDEMPTION SYSTEM AND METHOD

(75) Inventors: William R. Cunningham, Anna, IL (US); Douglas E. Devore, Dongola, IL (US)

(73) Assignee: Cunningham Electronics Corporation, Anna, IL (US)

( * ) Notice: Subject to any disclaimer, the term of this patent is extended or adjusted under 35 U.S.C. 154(b) by 267 days.

(21) Appl. No.: 12/907,870

(22) Filed: Oct. 19, 2010

Related U.S. Application Data

(63) Continuation-in-part of application No. 11/202,768, filed on Aug. 12, 2005, now Pat. No. 7,877,289, which is a continuation of application No. 10/838,896, filed on May 4, 2004, now Pat. No. 7,877,288, application No. 12/907,870, which is a continuation of application No. 11/765,026, filed on Jun. 19, 2007, now Pat. No. 8,090,615.

(60) Provisional application No. 61/253,051, filed on Oct. 19, 2009, provisional application No. 61/370,933, filed on Aug. 5, 2010, provisional application No. 60/467,805, filed on May 5, 2003, provisional application No. 60/601,194, filed on Aug. 13, 2004.

(51) Int. Cl.
*G06Q 30/00* (2012.01)
(52) U.S. Cl.
USPC ............................................. 705/14.47
(58) Field of Classification Search
USPC .................................... 705/14, 14.47
See application file for complete search history.

(56) References Cited

U.S. PATENT DOCUMENTS

| 4,949,256 | A | 8/1990 | Humble |
| 5,128,520 | A | 7/1992 | Rando et al. |
| 5,256,863 | A | 10/1993 | Ferguson et al. |
| 5,380,991 | A | 1/1995 | Valencia et al. |
| 5,428,684 | A | 6/1995 | Akiyama et al. |
| 5,832,458 | A * | 11/1998 | Jones ................ 705/14.26 |
| 6,041,309 | A | 3/2000 | Laor |
| 6,076,069 | A | 6/2000 | Laor |
| 6,321,208 | B1 | 11/2001 | Barnett et al. |
| 6,360,254 | B1 | 3/2002 | Linden et al. |
| 6,360,322 | B1 | 3/2002 | Grawrock |
| 6,385,591 | B1 | 5/2002 | Mankoff |
| 6,584,448 | B1 | 6/2003 | Laor |
| 6,779,747 | B2 | 8/2004 | McLean et al. |
| 7,013,286 | B1 | 3/2006 | Aggarwal et al. |

(Continued)

FOREIGN PATENT DOCUMENTS

WO         9530199         11/1995

OTHER PUBLICATIONS

Bruce Schneier, Applied Cryptography, 2nd Edition, 1996, John Wiley and Sons Inc., pp. 29-42.

*Primary Examiner* — Matthew L Hamilton
(74) *Attorney, Agent, or Firm* — Levenfeld Pearlstein, LLC

(57) ABSTRACT

The present invention comprises a universal coupon redemption system and method for redeeming both paper and electronic coupons that eliminates fraud. The system and method provides verification, validation and authentication of coupon redemption transactions in a third party environment while eliminating the need to ship coupons to manufacturers for reimbursement. In one embodiment, the system and method also advantageously addresses the increasingly complex identification of coupons by removing the encoded redemption requirements from the coupon itself and moving the redemption requirements to a third party coupon processing appliance.

16 Claims, 9 Drawing Sheets

(56) References Cited

U.S. PATENT DOCUMENTS

| | | |
|---|---|---|
| 7,016,860 B2 | 3/2006 | Modani et al. |
| 7,055,031 B2 | 5/2006 | Platt |
| 7,213,777 B2 | 5/2007 | Podrovitz |
| 7,240,843 B2 | 7/2007 | Paul et al. |
| 7,308,254 B1 | 12/2007 | Rissanen |
| 2001/0014870 A1 | 8/2001 | Saito et al. |
| 2002/0004783 A1 | 1/2002 | Paltenghe et al. |
| 2002/0010627 A1 | 1/2002 | Lerat |
| 2002/0042774 A1 | 4/2002 | Ortiz et al. |
| 2002/0055875 A1* | 5/2002 | Schulze et al. ............ 705/14 |
| 2002/0107738 A1* | 8/2002 | Beach et al. .............. 705/14 |
| 2002/0116271 A1 | 8/2002 | Mankoff |
| 2002/0138348 A1 | 9/2002 | Narayan et al. |
| 2002/0194069 A1 | 12/2002 | Thakur et al. |
| 2002/0198777 A1 | 12/2002 | Yuasa |
| 2003/0061170 A1 | 3/2003 | Uzo |
| 2003/0064713 A1 | 4/2003 | Deshpande |
| 2004/0054590 A1 | 3/2004 | Redford et al. |
| 2004/0103023 A1 | 5/2004 | Irwin et al. |
| 2004/0103312 A1 | 5/2004 | Messerges et al. |
| 2004/0143500 A1 | 7/2004 | Lopez et al. |
| 2004/0143501 A1 | 7/2004 | Lopez et al. |
| 2004/0158492 A1 | 8/2004 | Lopez et al. |
| 2005/0029798 A1* | 2/2005 | Dixon et al. ............... 283/52 |
| 2005/0033643 A1* | 2/2005 | Smith et al. ............... 705/14 |
| 2005/0125287 A1 | 6/2005 | Sureka et al. |
| 2005/0222910 A1 | 10/2005 | Wills |
| 2005/0240478 A1* | 10/2005 | Lubow et al. ............. 705/14 |
| 2006/0015404 A1 | 1/2006 | Tran |

* cited by examiner

MINIMUM COUPON IDENTIFYING CODE CONSTRUCTION
   [<Manufacturer Identification Number><Coupon Issue Number>]

DATA CENTER DOWNLOAD TO CPA (REDEMPTION DATA)
   [<Numerical Equivalent of the GS1 DataBar>]
   [<Numerical Equivalent of Minimum Coupon Code>]
   [<Manufacturers Redemption Requirements>]

REDEMPTION RECORD
   <Mfg. ID><Issue No.><Retailer ID><Store No.><Trans.Date><Trans. No.>
   <Coupon Value><Register No.><Clerk No.><Total No. Items>

FIG. 3

UNIVERSAL COUPON REDEMPTION SYSTEM AND METHOD

CROSS-REFERENCE TO RELATED APPLICATIONS

This application claims the benefit of U.S. provisional patent application Ser. No. 61/253,051, filed on Oct. 19, 2009, and U.S. provisional patent application Ser. No. 61/370,933, filed on Aug. 5, 2010. This application is a continuation-in-part of U.S. patent application Ser. No. 10/838,896, filed on May 4, 2004, now pending, which claims the benefit of U.S. provisional patent application Ser. No. 60/467,805, filed on May 5, 2003. This application is a continuation-in-part of U.S. patent application Ser. No. 11/202,768, filed on Aug. 12, 2005, now pending, which claims the benefit of U.S. provisional patent application Ser. No. 60/601,194, filed on Aug. 13, 2004. This application is a continuation-in-part of U.S. patent application Ser. No. 11/765,026, filed on Jun. 19, 2007, now pending, which is a continuation-in-part of U.S. patent application Ser. No. 11/202,768, filed on Aug. 12, 2005, now pending, which claims the benefit of U.S. provisional patent application Ser. No. 60/601,194, filed on Aug. 13, 2004.

BACKGROUND OF THE INVENTION

The present invention relates generally to coupons and coupon redemption and, more particularly, to a universal coupon redemption system and method for issuing and redeeming both paper and electronic coupons.

Coupons long have been a valuable marketing tool for manufacturers and retailers seeking to increase sales. Although coupons first were introduced decades ago, the process for issuing and redeeming coupons has remained relatively unchanged over time and, in many respects, has become antiquated and subject to fraud.

Traditional paper coupons generally are issued by manufacturers and distributed to consumers through many well known channels, such as newspapers, magazines, direct mailings, and the like. Consumers then collect the published coupons and present them to a participating retailer for redemption at the retailer's cash register when making a purchase.

Redemption of such coupons in the prior art ranges from coupon validation by visual inspection by the retailer's cashier to sophisticated POS systems that compare the POS system-decoded coupon barcode data to the transaction log of the purchase transaction to validate the coupon. However, no known prior art coupon redemption systems, with the exception of the systems and methods disclosed in United States patent applications which are commonly owned with the present application, and to which the present application claims priority, which are incorporated herein by reference, provide an audit trail to identify and audit the coupon redemption transaction. Thus, the possibility for fraud exists.

Regardless of the method by which a coupon is redeemed by a retailer, all paper coupons collected by the retailer in traditional prior art coupon redemption systems are manually sorted and returned to the manufacturers for reimbursement. Typically, this is done by a professional clearinghouse. Retailers bundle together redeemed paper coupons and ship them to the clearinghouse. The clearinghouse then sorts the coupons by manufacturer and retailer and forwards the coupons to the appropriate manufacturers along with an invoice for payment.

The manufacturer generally reviews the coupons for evidence of fraud (for example, large numbers of similarly and evenly cut coupons, similar cuts and tears, consecutive numbering, counterfeits and/or any other irregularities as published by the Joint Industry Coupon Committee ("JICC")[1], and then issues reimbursement checks to the retailers, through the clearinghouse, based on the number of coupons that the manufacturer deems valid.

[1] Such irregularities, as provided by the JICC, can include: (a) Store Sold or Closed; (b) No Store at this Address; (c) Coupon Appearance; (d) Counterfeit; (e) Consecutively Numbered; (f) Gang-cut; (g) Similar Cuts & Tears; (h) Washed; (i) Wrinkled; (j) Expired Coupons; (k) Abnormal Coupon Mix; (l) Proof of Purchase Required; (m) Excessive Coupon Volume; (n) Does Not Stock Product; (m) Out of Coupon Distribution Area; (o) Non-Coupons; (p) Billed to Incorrect Address Or Mfg.; (q) Invoice Calculation Error; (r) Claimed Coupon $ Exceeds Mfg stated; (s) Overage; (t) Shortage; (u) Illegible Tags; (v) Excessive Postage/Insurance; (w) Ineligible in-Ads; (x) Mfg. Has Not Paid Invoice; (y) Retailer Payment Suspended; (z) Held for Review; (aa) In-Ad Offer Discrepancy; (bb) Non-Compliance of In-Ad Promotion Terms; (cc) Competitive Retailer's In-Ad Coupon; (dd) Non-Compliance of In-Ad Promotion Period; (ee) In-Ad Contract Not On File; (ff) Addition Store Tag(s) Received; (gg) Claimed Store Tag(s) Not Received; (hh) No Payment Adjustment Made; (ii) Agent Recommended No Pay; Mfr Paid; (jj) No Bar Code; and, (kk) Bar Code Won't Scan.

Often times the manufacturers require that the retailers provide proof of purchase of the products which, in most cases, cannot be proven by the retailer without an extensive search of the retailer's records; and, in some cases, proof of purchase cannot be proved at all when a retailer utilizes a manual system of posting of customer receipts and issues the credit to the customer without recording the lengthy coupon identification number.

If some coupons are deemed invalid by the manufacturer, for lack of proof of purchase or otherwise, the retailer will not be reimbursed for such coupons. This is known as a "chargeback." However, in an effort to combat such chargebacks, some retailers will deduct the amount of the chargeback from the retailer's future payments to the manufacturer for products delivered to the retailer. This time-consuming process creates additional costs for manufacturers, retailers, and, ultimately, consumers.

Additionally, under most known coupon redemption systems, it may take anywhere from three to twelve weeks to complete the coupon redemption process through the point of reimbursement to the retailer, during which time the retailer must float the amount of the redeemed coupons, thus creating additional financial burden that is ultimately paid by the consumer. Thus, prior art coupon redemption systems are inefficient and uneconomical.

Moreover, not only is the traditional prior art paper coupon redemption process costly and time-consuming, it also is replete with opportunities to defraud manufacturers and retailers on many levels. Such fraudulent activities often are being written off as a cost of doing business and are passed on to the consumer, creating further unnecessary cost.

Coupon fraud is a long recognized problem in the coupon industry, and it is a problem that is receiving increased attention. Simple cases of fraud arise when consumers intentionally submit to retailers expired coupons or coupons for products, sizes, quantities and/or combinations thereof that were not actually purchased by the consumer during the purchase transaction.

However, even more significant problems stem from two major opportunities to commit fraud in the traditional prior art coupon redemption process. The first opportunity lies in the ability of a consumer to create and redeem a counterfeit coupon. In this context, a counterfeit coupon is a copy of an invalid coupon that has the appearance of a valid coupon. For example, with the widespread availability and use of relatively inexpensive and high-quality personal computer equipment, coupons easily may be forged, making an invalid coupon appear valid on its face. By some accounts, redemption of counterfeit coupons costs the United States coupon industry hundreds of millions of dollars every year.

The second opportunity for fraud in the coupon redemption process lies in the practice of shipping coupons to the manufacturer or the manufacturer's representative (the clearinghouse) for reimbursement, without controls for authenticating the number of, and value of, the coupons shipped. For example, a recent coupon fraud case filed against coupon clearinghouse alleged a complex fraudulent coupon redemption scheme netting over $250 million.

With the hope that encoding more data on coupons will help reduce fraud, recent advancements in barcode technology have resulted in a shift in the coupon industry to more complex barcodes that can store more data. To that end, traditional barcodes (such as UPC coupon and UCC/EAN-128 extended barcodes) are in the process of being supplanted by reduced space symbology ("RSS") barcodes (known as the GS1 DataBar) which allow significant amounts of data to be encoded in a reduced physical space. Thus, the GS1 DataBar barcodes are capable of encoding complex coupon redemption requirements on coupons.

However, the more complex the barcode symbology and the greater the amount of data encoded in such barcode, the more advanced the decoding software must be and the more robust the POS system must be in order to properly validate the more complex barcode data. Moreover, the more data included in the barcode, the more physical space the barcode must occupy on the coupon.

Thus, the coupon industry's efforts to reduce fraud are resulting in the need for more complex systems with increasing large and complex barcodes taking up valuable real estate on coupons. The POS system upgrades required to meet the coupon industry's efforts to reduce fraud are expensive and, in many cases, cannot be met by smaller retailers due to the financial burden. Thus, the very efforts the coupon industry is taking to combat fraud and reduce overall costs are, ironically, creating greater cost for the retailers.

What is needed, therefore, is a simpler, cost-effective universal coupon redemption system and method that provides a solution for coupon fraud. Desirably, such a coupon redemption system and method can redeem both paper and electronic coupons. More desirably, such a coupon redemption system is controlled by an independent third party to directly handle coupon validation, verification and redemption. Even more desirably, such a coupon redemption system and method can be readily integrated into retailers' existing POS systems, including self-checkout systems, for a relatively modest cost. Most desirably, such a coupon redemption system and method provides a verifiable coupon redemption audit trail. The present invention satisfies these needs.

BRIEF SUMMARY OF THE INVENTION

The present invention comprises a universal coupon redemption system and method for redeeming both paper and electronic coupons that incorporates the ability to audit each coupon redemption record processed for payment. The system and method of the present invention addresses the two major origins of fraud in prior art coupon redemption systems: it eliminates the opportunity for consumers to create and redeem counterfeit coupons, and it eliminates the need to ship coupons to clearinghouses for reimbursement. Moreover, the system and method of the present invention also advantageously addresses the increasingly complex identification of coupons by removing the encoded redemption requirements from the coupon by providing the ability to validate coupons based on the coupon issuer's registered coupon redemption requirement data.

In the disclosed embodiment, the universal coupon redemption system and method of the present invention comprises a data center in which coupon information is managed and maintained for both for paper coupons and for electronic coupons. The data center contains a central coupon registry where coupon issuers register their coupons.

The coupon registry database is downloaded to a coupon processing appliance ("CPA") located in each participating retailer's store. The CPA is used to verify and validate coupons presented for redemption. The verification and validation process for paper coupons involves the cashier scanning the coupon's barcode using the retailer's POS system. The POS system downloads the coupon barcode data and the items purchased to the CPA. The CPA compares the coupon's barcode data against the local copy of the coupon registry database stored in the CPA. If there is a match, the CPA queries the list of products purchased to determine if the redemption requirements of the coupon have been met.

If the coupon's redemption requirements have been met, the coupon is validated and the POS system is notified to issue a credit to the customer in the amount of the coupon as designated in the validation requirements. The CPA then generates and retains a copy of the coupon redemption transaction. The cashier then places the redeemed coupon in the cash drawer for further processing.

If the presented coupon is not on file in the local copy of the coupon registry database, or if the coupon's validation requirements are not met, the POS system generates a message on the cash register display advising the cashier and customer the reason why the coupon was not verified or validated.

Validated paper coupon redemption transactions are held in abeyance until the paper coupons from the cash drawer are matched to coupon transactions and shredded by a coupon shredder that is a built in to the CPA. As coupons are matched and shredded, the matched coupon redemption transactions are transmitted by the coupon redemption system to the data center for payment processing.

Validation of electronic coupons is accomplished in an identical manner; however, electronic coupons are presented to the retailer as prescribed by the electronic coupon distribution vendor.

In one embodiment of the universal coupon redemption system and method of the present invention, paper and electronic coupons may be identified in the coupon registry database using simple numeric equivalents of the coupons' GS1 DataBar. In this manner, the GS1 DataBar numeric equivalent may be used to verify, validate and redeem paper and electronic coupons. By taking advantage of the numeric equivalent of the GS1 DataBar barcode, coupon validation may be simplified. Moreover, by relying on the numeric equivalent of the GS1 DataBar barcode, a paper or electronic coupon may be identified only by a simple numeric code that generally will not exceed 18 digits and, in most cases, will be only 15-16 digits. Preferably, this is accomplished by creating a numeric equivalent based only on the manufacturer's ID and the manufacturer's coupon issue number.

Because the manufacturer's ID and the manufacturer's coupon issue number comprise the least amount of identifying data necessary to uniquely identify a coupon, relying on this minimum amount of information greatly simplifies use of the otherwise increasingly complex GS1 DataBar barcode. In this manner, the only encoded identifying data that needs to appear on the face of the coupon is the manufacturer's ID and the manufacturer's coupon issue number. This greatly simplifies the complexity of the GS1 DataBar barcode that appears on the coupon and saves valuable space on the face of the coupon.

As will be apparent to those skilled in the art, there are numerous additional advantages of the coupon redemption system and method of the present invention. First, the coupon redemption system and method of the present invention provides transparency of coupon redemption transactions by recording an audit trail for each coupon redemption transaction and reporting the applicable coupon redemption transactions including their audit trails to both manufacturers and retailers.

Another advantage of the present coupon redemption system and method is the elimination of shipment of paper coupons to clearinghouses and other outside operations, thereby saving costs. Shipment of paper coupons can be eliminated because the coupon redemption system and method of the present invention captures and reports the source of the coupon transaction, as discussed above. Moreover, in the case of a paper coupon, the redeemed paper coupon is destroyed before the coupon redemption transaction is released to the manufacturer for reimbursement to the retailer. This provides an additional level of security and fraud protection.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 3 is a chart of the data structures of the universal coupon redemption system and method in the preferred embodiment of the present invention;

DETAILED DESCRIPTION OF THE INVENTION

Figure 1:
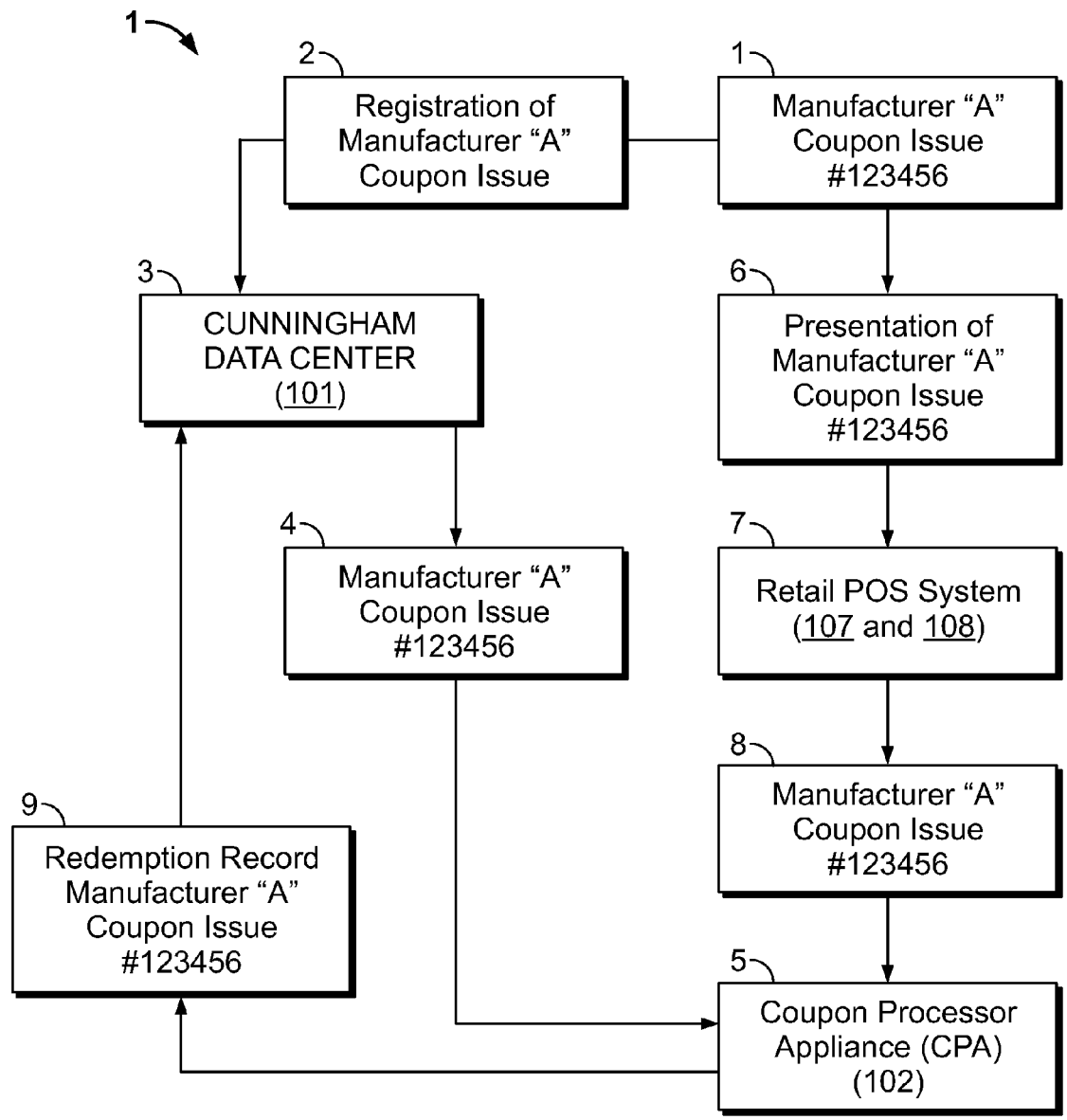
FIG. 1 is an operational diagram showing the major components of the universal coupon redemption system and method in the preferred embodiment of the present invention.

While the present invention is susceptible of embodiment in various forms, there are shown in the drawings and will hereinafter be described a preferred embodiment with the understanding that the present disclosure is to be considered an exemplification of the invention and is not intended to limit the invention to the specific embodiments illustrated.

It should be further understood that the title of this section of the specification, namely, "Detailed Description of the Invention," relates to a requirement of the United States Patent and Trademark Office, and does not imply, nor should be inferred to limit the subject matter disclosed herein.

The universal coupon redemption system and method of the present invention is a comprehensive solution to the myriad problems that plague the redemption of coupons today in the retail market place. The two major problems associated with coupon redemption are malredemptions/misredemptions and coupon fraud. The system and method of the present invention solves both of these problems.

Figure 2:
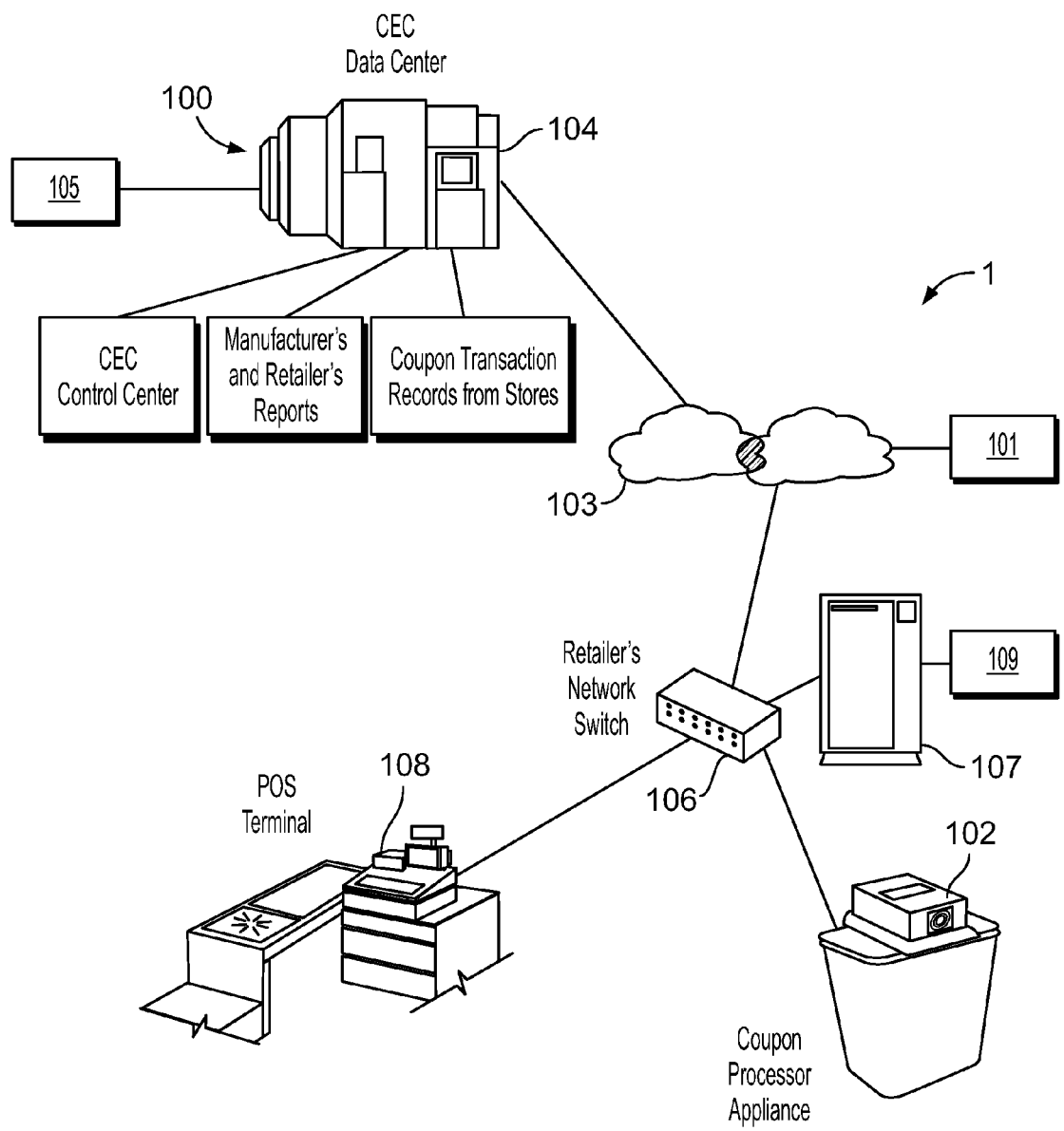
FIG. 2 is a schematic network diagram showing the major components of the universal coupon redemption system and method in the preferred embodiment of the present invention.

As shown generally in FIGS. 1 and 2, the preferred embodiment of the coupon redemption system and method 1 of the present invention comprises a data center (sometimes referred to herein and in the drawings as the "Cunningham Data Center", "CEC Data Center," "CDC" or "data center") in which coupon information is managed and maintained for both for paper coupons and for electronic (or digital) coupons.

The data center 100 preferably comprises a network-connected server 104 in communication with manufacturer computing devices 101 and retailer coupon processing appliances ("CPAs") 102 (the CPA is shown disposed above a trash can or recycling bin in FIG. 2 to receive the shredded coupons, as further discussed below) over a computer data network 103. Such servers 104 generally are known to those skilled in the art and may be specially programmed to allow for the method of the present invention to be performed by the server in communication with manufacturer computing devices 101 and retailer coupon processing appliances 102 over the network 103.

The computer data network 103 may, for example, be a wide area network, such as the Internet, a local area network and/or any other computing network as known to those skilled in the art. The server 104 preferably is a network-capable server and typically includes a microprocessor, memory, a network interface, a keyboard and a monitor, again as known to those skilled in the art.

Preferably, the server 104 is at the premises of and/or controlled by a third party administrator of the universal coupon redemption system and method 1 of the present invention. The manufacturer computing devices 101 preferably are at the premises of and/or controlled by a manufacturer wishes to include their coupons in the system and method 1 of the present invention. The retailer coupon processing appliances 102 preferably are at the premises of and/or are controlled by a retailer who wishes to participate in the system and method 1 of the present invention.

However, those skilled in the art will recognize that the locations and/or controllers of the server 104 and the manufacturer computing devices 101 may vary without departing from the scope and spirit of the present disclosure, although it should be understood that neither a manufacturer nor a retailer should have control over the server 104 to insure the integrity of the system and method 1 of the present invention.

Additionally, it will be appreciated by those skilled in the art that the system and method 1 of the present invention may comprise a plurality of servers 104 and numerous manufacturer computing devices and retailer coupon processing appliances 102 as may be necessary to adequately handle a desired number of manufacturers and retailers as may use the system and method 1.

The server 104 preferably is configured to store an operating system, such as Windows NT Server, Mac OS X, UNIX or similar network-aware operating system, as well as application software that enables the server to execute the steps of the universal coupon redemption method 1 of the present invention, which preferably is programmed as software instructions stored on the server 104.

To that end, the application software may include an internet Web server, such as the Apache Web server or Microsoft IIS; an interpreter, real-time compiler, or libraries allowing execution of programs in a known computing language, such as Perl or Visual Basic; and, a database engine, such as Microsoft SQL Server, or Oracle.

Moreover, in the preferred embodiment of the universal coupon redemption system and method 1 of the present invention, the application software residing on the server 104 is compiled using a software product to encrypt the application software, wrapping a protective layer around the software. In the preferred embodiment of the system and method 1 of the present invention, such software product comprises CodeArmor, commercially available from V.i. Labs. Encrypting the application software advantageously results in an executable application software program that is protected against reverse engineering, malicious attack or modification.

Additionally, as further described below, the server 104 preferably comprises a database configured to store data about the participating manufacturers' coupons. The database may be a relational database, or any other suitable type of database as is known in the art. As will be further appreciated by those skilled in the art, the memory of the server 104 may include any suitable combination of random access memory, read-only memory, disk storage memory or the like as is known to those skilled in the art.

The manufacturer computing devices 101 preferably are network-aware "client" computers as are widely used in homes and businesses, and typically include: a microprocessor; a network interface, such as a modem, Ethernet interface or wireless interface; a keyboard and/or other input devices; a display; and memory storing an operating system such as Windows, the Mac OS X, Linux or the like. Such computing devices are generally known to those skilled in the art.

Additionally, the manufacturer computing devices 101 preferably include network interface software and a hypertext markup language ("HTML")-capable browser, such as Microsoft's Internet Explorer or Apple's Safari. It will be appreciated by those skilled in the art that such browser should be capable of interpreting and executing program instructions downloaded from the network and from the server 104.

As discussed above, the data center 100 stores a central coupon registry ("registry" or "coupon registry database") 105 where coupon issuers (manufacturers) register their coupons. Registration of a coupon consists of the coupon issuer (the manufacturer or an agent for the manufacturer) accessing the data center 100 using their manufacturer computing devices 101 to access a password-protected website used to register their coupons. Registration data for a coupon includes the purchase requirements associated with the coupon and used to validate the coupon during redemption.

Thus, the coupon registry 105 is a comprehensive database of coupon offers from all manufacturers using the universal coupon redemption system and method 1 of the present invention. The records within this coupon registry database 105 contain all of the necessary information required to ensure that each coupon redeemed at a participating retailer's store has been verified as authentic and that all of the coupon's redemption requirements have been validated when the coupon is presented for redemption. Preferably, the registry 105 is stored electronically in the data center 100 as noted above.

The master registry 105 as stored in the data center 100 is refreshed on an as-needed basis and an updated copy of the registry 105 is downloaded from the data center 100 to each retailer's CPA 102 as a daily scheduled activity. The local (CPA) copy of the registry 105 is refreshed at the retailer level to keep it current with coupon issues that are added to or deleted from the master registry 105. The local (CPA) copy of the registry 105 is updated by the CPA accessing the data center 100 on which the master registry 105 is stored through the retailer's network interface device 106 (which may be a network switch) which accesses the data center 100 through computer data network 103.

As further shown in FIGS. 1 and 2, and as discussed in further detail below, the coupon registry database 105 is downloaded to a coupon processing appliance 102 ("CPA") located in each retailer store that participates in the coupon redemption system and method 1 of the present invention. The CPA 102 is used to verify and validate coupons presented for redemption using the system and method of the present invention, as further discussed below.

Broadly speaking, and as further described in detail below and shown in FIGS. 1, 2, 4, 5 and 6, the verification and validation process for paper coupons using the universal coupon redemption system and method 1 of the present invention involves the cashier scanning the coupon's barcode using the retailer's POS terminal 108. The POS terminal 108 communicates with the retailer's POS controller 107 through the retailer's network interface device 106 (together, the POS terminal 108 and the POS controller 107 are sometimes referred to herein as the "POS system").

Once all products have been scanned, the POS system communicates the coupon barcode data and the list of items purchased to the CPA 102. The CPA 102 then compares the coupon's barcode data against the local copy of the coupon registry database 105 stored in the CPA 102. If there is a match, the CPA 102 queries the list of products purchased during the transaction (the "transaction log" or "TLOG") to determine if the redemption requirements of the coupon have been met.

If the coupon's redemption requirements have been met, the coupon is validated and the CPA 102 instructs the POS system to issue a credit to the customer in the amount of the coupon as designated in the validation requirements in the coupon registry database 105. The CPA 102 then generates and retains a copy of the coupon redemption transaction, and the cashier places the redeemed coupon in the cash drawer for further processing.

If the presented coupon is not on file in the local copy of the coupon registry database 105, or if the coupon's validation requirements are not met, CPA 102 instructs the POS system to generate a message on the cash register display of the POS terminal 108 advising the cashier and customer of the reason why the coupon was not verified or validated.

Validated paper coupon redemption transactions are held in abeyance until the paper coupons from the cash drawer are matched to the coupon transactions and shredded by a coupon shredder built in to the CPA 102. As coupons are matched and shredded, the matched coupon redemption transactions are transmitted by the CPA 102 to the data center 100 for payment processing.

Validation of electronic coupons is accomplished in an identical manner; however, electronic coupons are presented to the retailer as prescribed by the electronic coupon distribution vendor, and validated electronic coupon transactions transmitted by the CPA 102 to the data center 100 for payment processing under the same conditions as paper coupons.

The universal coupon redemption system and method 1 of the present invention provides, in the preferred embodiment, for weekly payment processing for paper and electronic coupons redeemed Sunday through Saturday. On the following Monday, the coupon redemption system and method 1 sends participating manufacturers and retailers a summary statement or report of coupons redeemed along with the supporting coupon redemption transaction records.

In the preferred embodiment, an independent third party bank account is maintained for processing payments to maintain the neutrality of the system. Manufacturers' payments into the account preferably occur on Wednesdays, while payments to retailers from the account preferably occur on Fridays. However, those skilled in the art will recognize that the precise payment dates may vary without departing from the scope of the instant disclosure.

The preceding broad description of the operation of the universal coupon redemption system and method 1 of the present invention is summarized in simplified form as shown in FIG. 1.

A manufacturer issues a coupon for a product at step 1 (the manufacturer is identified by the designation "Manufacturer A" and the coupon is represented by an exemplary issue number 123456, in FIG. 1). At step 2, the manufacturer registers the coupon with the system and method 1 of the present invention where the coupon and its redemption requirements are stored at step 3 in the master registry 105 of the data center 101. At step 4, the coupon data is downloaded to the CPA 102 and stored at step 5 as a part of the local copy of the registry 105 on the CPA 102.

At step 6, a customer presents the coupon to a cashier during a product purchase transaction. The POS system (comprising the POS terminal 108 and the POS controller 107) then communicate (at step 7) the coupon identification information to the CPA 102 at step 8.

The CPA 102 validates and verifies the coupon by confirming that the coupon is in the registry 105 and that all of the coupon's redemption requirements have been met and, if so, instructs the POS system to issue the appropriate credit to the customer. Once the physical redeemed coupon is scanned and shredded by the CPA 102, the CPA 102 sends the record of the redemption transaction (at step 9) to the data center 101 so that the manufacturer can reimburse the retailer.

While the foregoing provides a broad, general overview of the universal coupon redemption system and method 1 of the present invention, the following provides further detail regarding additional components of the system and offers more specific operational details.

Figure 4:
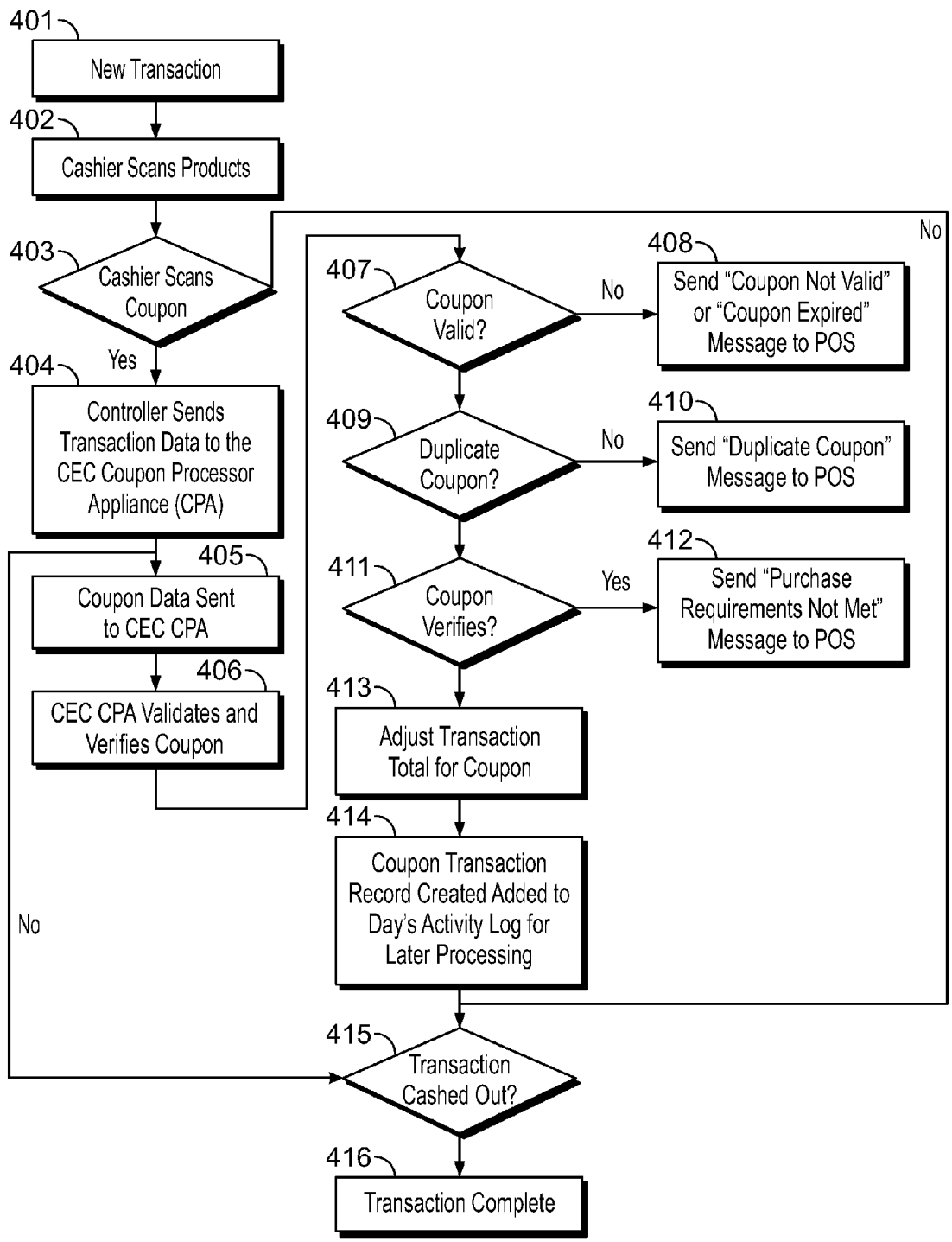
FIG. 4 is a data flowchart illustrating the steps for validating and verifying a coupon using the universal coupon redemption system and method in the preferred embodiment of the present invention.
Figure 5:
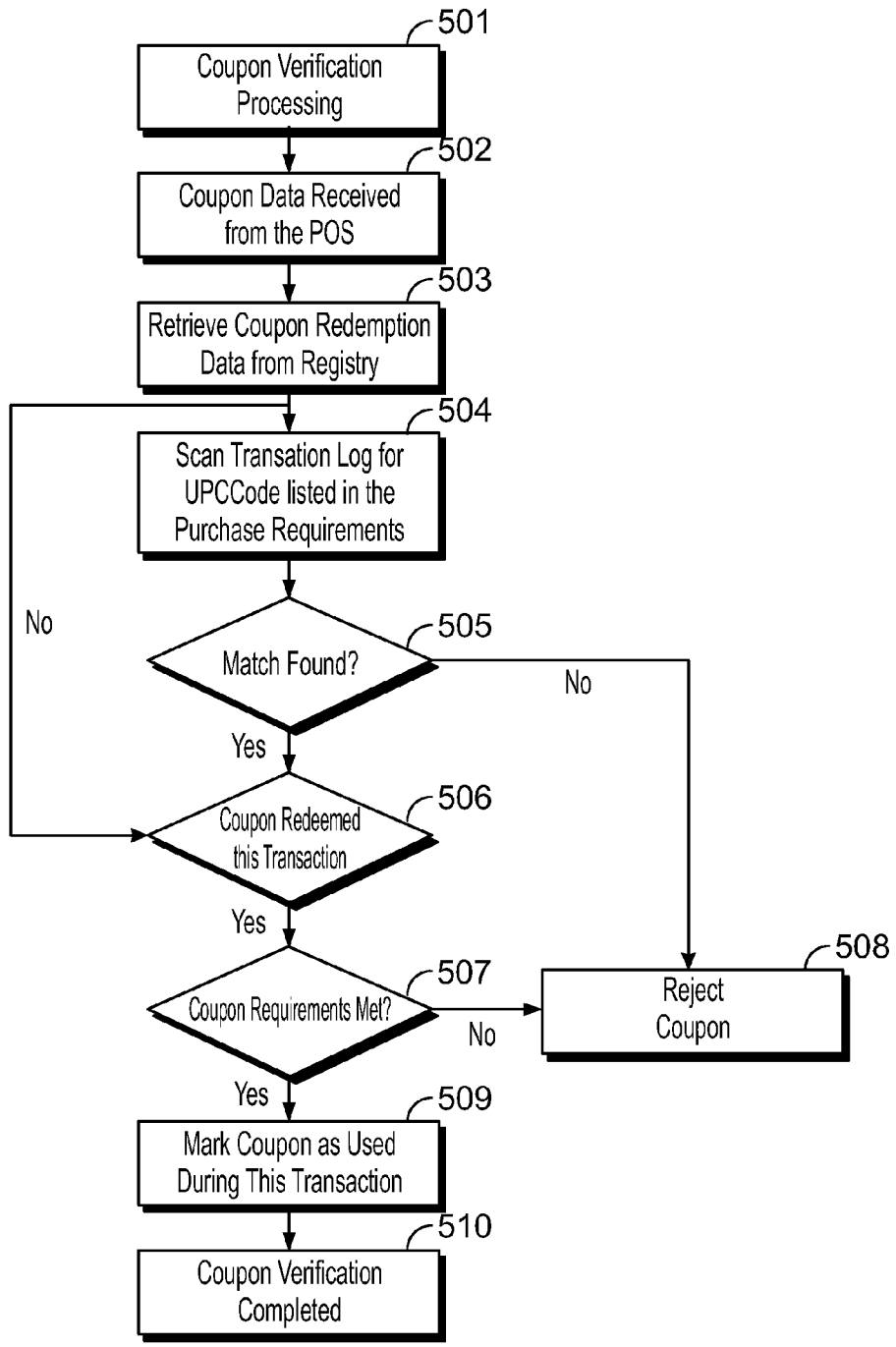
FIG. 5 is a data flowchart illustrating the steps for operation of the coupon processor appliance ("CPA") using the universal coupon redemption system and method in the preferred embodiment of the present invention.
Figure 6:
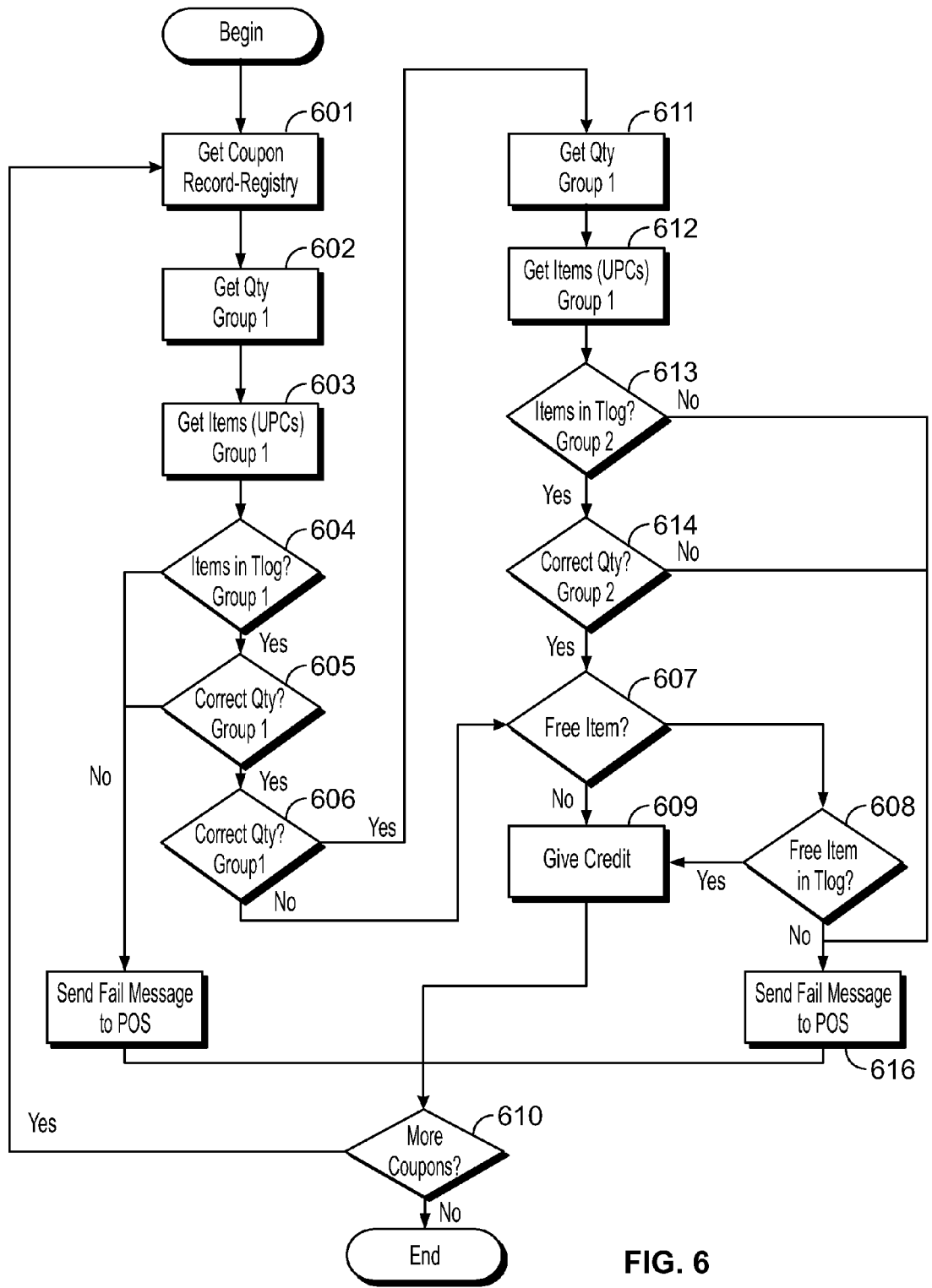
FIG. 6 is a data flowchart illustrating the steps for validating a coupon using the universal coupon redemption system and method in the preferred embodiment of the present invention.

FIGS. 4-6 illustrate, in the preferred embodiment, the operation of the universal coupon redemption system and method 1 of the present invention, building upon the general operational description presented above.

As shown in FIG. 4, the universal coupon redemption system and method 1 of the present invention operates as follows in the preferred embodiment. The system and method 1 begin with a new product purchase transaction at step 401. During a product purchase transaction the retailer's cashier scans the products being purchased during the transaction at step 402.

Once all of the products have been scanned, the retailer's cashier then scans the coupons presented by the customer at step 403. If no coupons are presented by the customer, the purchase transaction is cashed out at step 415 and the purchase transaction is completed at step 416. However, if coupons are presented by the customer at step 403, the coupons are scanned by the POS terminal 108 and the scanned coupon data is transmitted to the POS controller 107 through the retailer's network interface device 106.

At step 404, the POS controller 107 communicates the coupon data to the CPA 102, again through the retailer's network interface device 106. Once the coupon data is sent to the CPA 102 at step 405, the CPA 102 validates and verifies the coupon (as further described below) at step 406. If the coupon is not valid (as further described below), the CPA 102 communicates with the POS controller 107 at step 408 and instructs the controller to display a "Coupon Not Valid" and/or "Coupon Expired" or similar message to the retailer's cashier and the customer through the POS terminal 108 (the display on the cash register) and the coupon is not processed further and is not redeemed. However, if the coupon is valid, the CPA 102 then checks at step 409 to see whether the coupon previously has been redeemed during the purchase transaction (a duplicate coupon).

If the coupon already has been redeemed during the purchase transaction, the CPA 102 communicates with the POS controller 107 at step 410 and instructs the controller to display a "Duplicate Coupon" or similar message to the retailer's cashier and the customer through the POS terminal 108 (the display on the cash register) and the coupon is not processed further and is not redeemed. However, if the coupon is not a duplicate, the CPA 102 then verifies the coupon at step 411 to confirm whether the coupon's purchase requirements have been met (as further described below).

If the coupon's purchase requirements have not been met (that is, the coupon cannot be verified), the CPA 102 communicates with the POS controller 107 at step 412 and instructs the controller to display a "Purchase Requirements Not Met" or similar message to the retailer's cashier and the customer through the POS terminal 108 (the display on the cash register) and the coupon is not processed further and is not redeemed. However, if coupon's purchase requirements have been met (that is, the coupon is verified), the CPA 102 then communicates with the POS controller 107 at step 413 and instructs the POS controller 107 to issue a credit for the value of the coupon. The CPA 102 then adds the coupon redemption transaction record to the day's activity log for later processing at step 414 (as further described below).

Once all coupons have been processed in the manner discussed above, the product purchase transaction is cashed out at step 415 and the completed at step 416.

In the preferred embodiment of the universal coupon redemption system and method 1 of the present invention, the basic coupon redemption rules are as follows: one coupon type per customer per transaction; a product used for the validation of a coupon cannot be used twice; and, purchased products are used to validate coupons in the order in which the coupons are received. The coupon validation and verification processes described herein follow the preceding coupon redemption rules. However, those skilled in the art will recognize that the coupon redemption rules may be varied without departing from the scope of the instant invention, and all such variations are included within the scope of the present disclosure.

As discussed above, coupon validation and verification (described generally at steps 407, 409 and 411, above) involves confirming that the coupon is registered in the registry 105, confirming that the coupon has not already been redeemed during the purchase transaction and confirming the all of the coupon's purchase requirements for redemption have been met. These steps are shown and described in further detail in FIGS. 5-6.

In the preferred embodiment of the universal coupon redemption system and method 1 of the present invention, coupon verification processing (step 501) begins when the first coupon presented for redemption by the customer is scanned by the retailer's POS system during a product purchase transaction (at step 403 in FIG. 4). The product purchase transaction's data (the "transaction log" or "TLOG") is communicated by the POS system to the CPA 102 along with the first coupon's barcode data (at steps 404 and 405 in FIG. 4, and step 502 in FIG. 5). The TLOG, as known to those skilled in the art, is a summary of all products presented for purchase during a product purchase transaction.

At step 503, the CPA 102 compares the coupon's barcode data with the local copy of the registry 105 stored on the CPA 102 to confirm that the coupon is registered and, if so, the CPA 102 retrieves and assembles all of the coupon's redemption requirements as retrieved from the local copy of the registry 105 at step 503. At step 504, the CPA 102 then scans the current product purchase transaction's TLOG (as communicated to the CPA 102 by the POS system) to ensure that the required product(s) have been purchased by looking for matching product information at step 505. If no match is found, the coupon is rejected at step 508 and the coupon verification process for the coupon is completed.

If a match is found, then the CPA 102 deems the coupon to be redeemable at step 506 and then continues the verification process by confirming whether the coupon's redemption requirements have been met at step 507 (as shown in further detail in FIG. 6, and as further described below). If the redemption requirements for the coupon have not been met (such as failure of the customer to purchase the correct quantity and/or combination of products, for example) coupon is rejected at step 508 and the coupon verification process for the coupon is completed.

If the redemption requirements for the coupon have been met, the CPA 102 communicates the coupon's redemption value, as retrieved from the coupon's record stored in the local copy of the registry 105, to the POS system with instructions to apply the value of the coupon to the product purchase transaction's total as an adjustment. At step 509 the CPA 102 also marks or flags the coupon as having being used during the particular product purchase transaction so that the same coupon cannot be reused during the same product purchase transaction.

At this point, the coupon verification processing is complete (step 510) for the coupon, and the preceding coupon verification process is repeated for each coupon submitted by the customer. At the end of the product purchase transaction, the TLOG data is saved by the CPA 102 to be later sent to the data center 100 once the surrendered coupons have been destroyed by the CPA 102, as further described below.

As discussed above, one part of coupon verification process involves confirming whether the coupon's redemption requirements have been met (at step 507). This process is shown in further detail in FIG. 6. This process begins at step 601 with the CPA 102 identifying the coupon (from the coupon's bar code as communicated by the POS system, as discussed above) and retrieving the coupon's product quantity purchase requirements (step 602) and product (or item) purchase requirements (the UPC, or universal product code) of the product to which the coupon applies (at step 602) from the local copy of the registry 105 stored on the CPA 102.

At step 604, the CPA 102 next scans the TLOG for the product purchase transaction to confirm that the correct product (or item) has been purchased during the product purchase transaction by looking for the appropriate UPC code. If the coupon's product (or item) purchase requirements have not been met (that is, the correct product was not purchased during the product purchase transaction), the CPA 102 communicates with the POS controller 107 at step 616 and instructs the controller to display a coupon redemption failure message through the POS terminal 108 (the display on the cash register) and the coupon is not processed further and is not redeemed.

If the coupon's product (or item) purchase requires have been met (that is, the correct product was purchased during the product purchase transaction), the CPA 102 then scans the TLOG to confirm that the product was purchased in the correct quantity as required by the coupon's redemption requirements at step 605. If the coupon's product (or item) quantity purchase requirements have not been met (that is, the correct number of products were not purchased during the product purchase transaction), the CPA 102 communicates with the POS controller 107 at step 616 and instructs the controller to display a coupon redemption failure message through the POS terminal 108 (the display on the cash register) and the coupon is not processed further and is not redeemed.

If the coupon's product (or item) quantity purchase requirements have been met (that is, the correct quantity of products were purchased during the product purchase transaction), the CPA 102 then confirms whether the coupon's redemption requirements require that a second product be purchased at step 606. If coupon's redemption requirement require the purchase of a second product, then steps 601 through 605 are repeated for the second product (at steps 611 through 614) the same manner as discussed above.

Once the coupon's product purchase redemption requirements have been satisfied, as described above, at step 607 the CPA 102 then scans the coupon's redemption requirements to determine whether the coupon provides for a "free item" as part of the redemption of the coupon. If so, at step 608 the CPA 102 next scans the TLOG for the product purchase transaction to confirm that the correct free product (or free item) has been purchased during the product purchase transaction by looking for the appropriate UPC code. If the correct free product (or free item) was not purchased during the product purchase transaction, the CPA 102 communicates with the POS controller 107 at step 616 and instructs the controller to display a coupon redemption failure message through the POS terminal 108 (the display on the cash register) and the coupon is not processed further and is not redeemed.

If the correct free product (or free item) was purchased during the product purchase transaction or if the coupon provided only for a monetary discount when redeemed, then the CPA 102 communicates with the POS controller 107 at step 609 and instructs the POS system to issue a credit against the total price of the product purchase transaction in the amount called for by the coupon or in the amount of the free product (or free item). The above process is repeated at step 610 for all coupons presented for redemption during the product purchase transaction.

Figure 7:
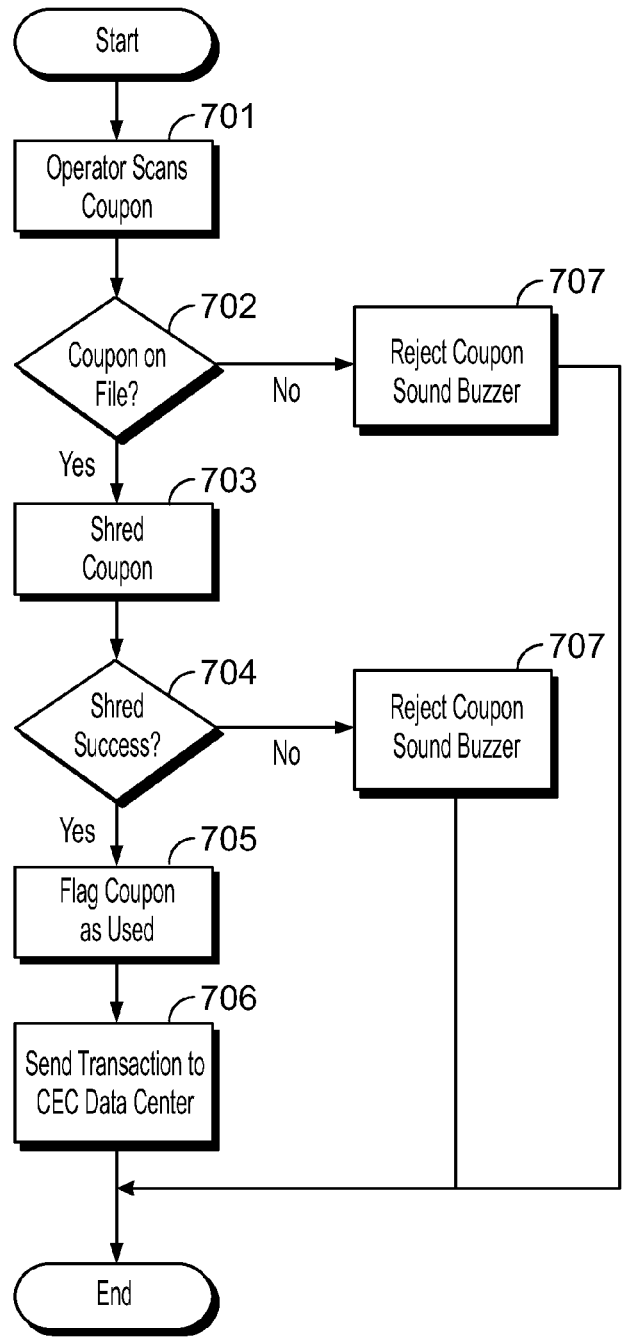
FIG. 7 is a data flowchart illustrating the steps for verifying use of a coupon and destroying the coupon using the coupon processor appliance of the universal coupon redemption system and method in the preferred embodiment of the present invention.

As discussed above, the CPA 102 retains copies of all TLOG data until the physical coupons that were surrendered for redemption during the product purchase transaction are destroyed by the CPA 102. Only after destruction of the coupons does the CPA 102 communicate to the data center 100 that the coupons have been properly redeemed and instruct the data center 100 to invoice the product manufacturer for reimbursement of the coupons to the retailers. This ensures that: (1) only coupons that have been properly validated, verified and redeemed are submitted to the product manufacturers for payment to the retailers; and, (2) coupons cannot be reused for subsequent product purchase transactions. This process is shown in FIG. 7 and discussed in further detail below.

All paper coupons validated using the universal coupon redemption system and method 1 of the present invention must be destroyed by the CPA 102 before the retailer will receive reimbursement for the coupons from the manufacturers. Electronic (digital) coupons are immediately sent to the data center 100 by the CPA 102 for processing once they have been validated and the product purchase transaction session has been concluded (as described above and shown in FIGS. 5-6).

To verify the paper coupon redemption transactions, the paper coupons surrendered by customers during the product purchase transactions are collected from the cash drawers (preferably at a regular interval, such as on a daily basis) and delivered to the CPA 102. Typically the CPA 102 is located in a back room or other administrative office at the retailer's facility and, preferably, the CPA 102 is operated by the retailer's authorized personnel or, in some embodiments of the system and method 1 of the present invention, by authorized representatives of the operator of the data center 100.

As further discussed in detail below, the CPA 102 is a device that includes, among other components, a barcode scanner and a shredder (or other means to permanently destroy paper coupons). As shown in FIG. 7, at step 701 an authorized operator of the CPA 102 inserts the paper coupons, one at a time, into the CPA 102 where the coupon bar code is scanned. At step 702, the coupon's barcode is decoded by the CPA 102 and the decoded data is compared against the TLOG files for all of the product purchase transactions that previously were stored on the CPA 102 (as discussed above).

If the coupon is located in a product purchase transaction TLOG file, and the coupon is not marked or flagged as having been previously verified (or processed and destroyed) by the CPA 102, the coupon is destroyed by the CPA 102. In the preferred embodiment, this occurs by shredding the coupon as further discussed below. Upon confirmation that the coupon has been successfully destroyed, at step 705 the CPA marks (or flags) the coupon as having been verified (or processed and destroyed) by the CPA 102 and the CPA 102 the communicates with the data center 100 at step 706 and sends data regarding the coupon redemption transaction to the data center 100 for further processing (invoicing the manufacturer for reimbursement to the retailer) and the data associated with that coupon redemption is purged from the internal data file of the CPA 102.

If the coupon is not located in a product purchase transaction TLOG file, or if the destruction of the coupon was not successful, the CPA 102 rejects the coupon and provides an audible and/or visual alert (such as through beeper 1004 of CPA 102) to the operator of the CPA 102 at step 707. Such rejected coupons are not communicated to the data center 100 for further processing.

The preceding process is repeated for all paper coupons collected from the cash drawers until no more coupons remain. This process preferably occurs on a regular basis, such as daily, but may be repeated more or less frequently, as desired, without departing from the scope of the present disclosure.

It is possible for coupons that have been successfully validated and stored in the CPA's internal data file to become orphaned. This can happen when the physical coupon is lost and/or never processed destroyed by the CPA 102. For this reason, the system and method 1 of the present invention preferably verifies coupons on a "first in, first out" basis. In the preferred embodiment of the present invention, a coupon record will be deemed orphaned if the physical coupon is not processed by the CPA 102 within three days following the expiration date and it will be purged from the system. However, as those skilled in the art will recognize, this time may be varied without departing from the scope of the instant disclosure.

Figure 8:
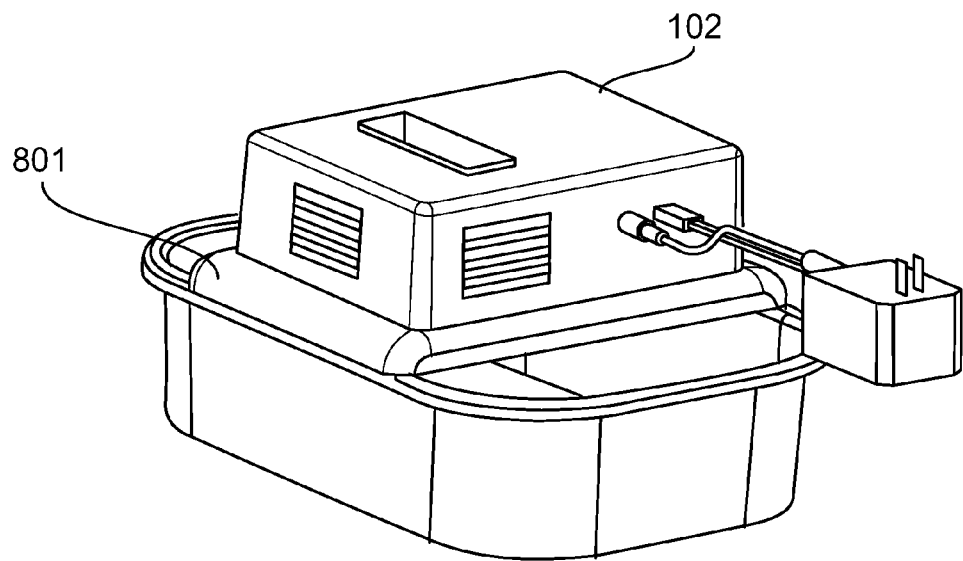
FIG. 8 is perspective view of the coupon processor appliance of the universal coupon redemption system and method in the preferred embodiment of the present invention.
Figure 9:
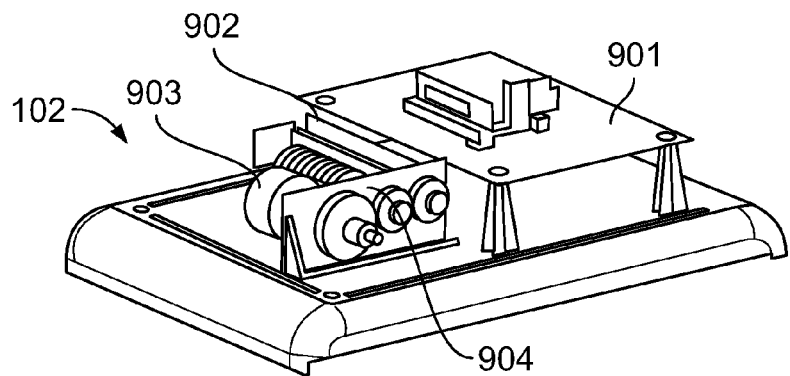
FIG. 9 is perspective view of the coupon processor appliance of the universal coupon redemption system and method in the preferred embodiment of the present invention, shown with the cover removed; and, FIG. 10 is a block diagram of the components of the coupon processor appliance of the universal coupon redemption system and method in the preferred embodiment of the present invention.
Figure 10:
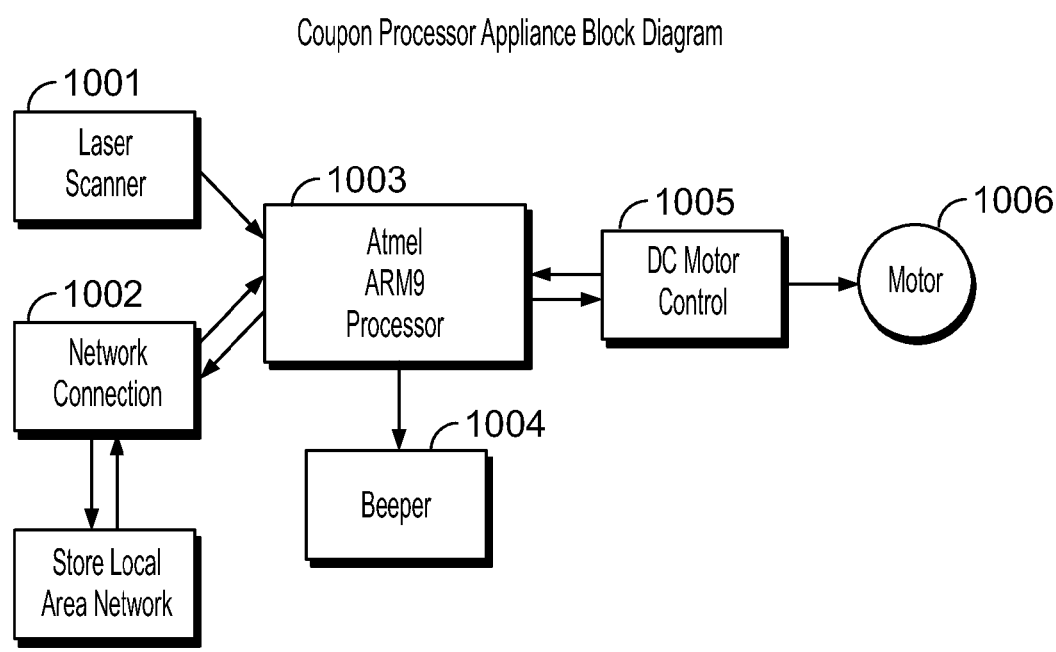

As discussed above, the CPA 102 preferably is located at each participating retailer's facility. FIGS. 8-10 show, in the preferred embodiment, the components of the CPA 102 which include: a housing/enclosure 801, a controller board 901, a laser barcode scanner 1001 and laser scanner controller board 902, network connection hardware 1002, a processor (or CPU) 1003, a beeper 1004, a DC motor control 1005, a motor 903, 1006 and a shredder 904 driven by the motor 903, 1006 (collectively, the final three components are referred to herein as the "coupon shredder assembly").

The coupon shredder assembly essentially is a specialized paper shredder designed to destroy redeemed coupons up to a size of 3 inches wide and 6 inches long, in the preferred embodiment of the system and method 1 of the present invention. Those skilled in the art will recognize that other maximum coupon sizes are possible without departing from the scope of the instant invention, and the CPA 102 and coupon shredder assembly may be scaled, if necessary, to accommodate different sized coupons.

The CPA 102 controller board 901 preferably is a microprocessor-based board configured to support the Linux operating system in the preferred embodiment. The CPU 1003 preferably should operate at a minimum clock rate of one 400 MHz and support a minimum of 1 GB of system memory plus up to 4 GB of flash memory (not shown). The flash memory preferably is mounted in a socket (or sockets) on the controller board 901. The controller board 901 handles several functions of the CPA 102 in the preferred embodiment, including: external communications (with the retailers' POS system and with the data center 100), barcode scanner 1001 interface and control, coupon shredder assembly control, cooling fan control (if the CPA 102 is equipped with a cooling fan) and flash memory support.

In the preferred embodiment of the universal coupon redemption system and method 1 of the present invention, communications between the CPA 102 and the retailer's POS controller 107 and the data center 100 are accomplished using an Ethernet communications link. This link preferably supports communication speeds of at least 10 Mbps. However, it will be appreciated by those skilled in the art that such communications also may occur via wireless protocols with appropriate hardware and with appropriate wireless communications and data encryption protocols, and all such protocols and communications methods are included within the scope of the instant disclosure.

The laser barcode scanner 1001 preferably comprises a Honeywell (Metrologic) IS4210 laser barcode scanner capable of scanning and decoding all of the major barcode symbologies in use today. The scanner preferably communicates using either a true RS-232 or TTL RS-232 interface, as are known to those skilled in the art. As the major barcode symbologies most relevant to the system and method of the present invention are the UPC12 and GS1 Databar, the scanner preferably should be programmed to read and decode at least these two barcode symbologies, and the decoding of the GS1 Databar barcode preferably takes precedence over a UPC12 barcode.

The laser barcode scanner 1001 preferably is mounted on a daughter board and the interface to the main CPA 102 controller board 901 preferably comprises a 1 mm×12 position FFC/FPC cable as is known to those skilled in the art.

The coupon shredder assembly preferably is controlled in such a manner as to allow the motor 1006 to run in both the forward or reverse directions. The forward direction preferably is used for coupon shredding (to feed the coupon into the coupon shredder assembly) while the reverse direction preferably is used to correct potential jams in the coupon shredder assembly. In the preferred embodiment of the CPA 102, the DC motor 1006 is a 12V motor manufactured by Hsiang Neng Corporation and marketed by TELCO Intercontinental Corp., Houston, Tex. under model number HN-GH12-2221T.

As a specific function of the CPA 102 the permanent destruction of a redeemed coupon, the system and method 1 of the present invention includes in the preferred embodiment a process for insuring that a redeemed coupon has been properly permanently destroyed. The process comprises measurement and monitoring of the current load of the motor 1006 by the CPA 102. This process provides added assurance that the coupon has been correctly inserted into the CPA 102 and that the coupon is being destroyed.

In order to properly interpret the current sense signal from the shredder motor 1006 current sensing circuitry, the CPA 102 first measures the amount of current the motor 1006 draws while there is no coupon being shredded. Using the levels generated during this phase, the CPA 102 develops minimum and maximum levels that can be used as indicators to determine whether there is a coupon being shredded. Periodic calibration runs help eliminate variations in the current levels as the shredder mechanism ages. These periodic calibrations preferably are run on a daily basis in order to maintain an accurate baseline.

The current level measurements also can be used as indicators of a defective motor 1006 or a jammed coupon shredder assembly. In the case of a jammed coupon shredder assembly, the CPA preferably should be capable of reversing the direction of the motor in an effort to clear the jam.

In the preferred embodiment of the CPA 102 in the system and method 1 of the present invention, the shredder motor 1006 preferably is equipped with an external thermostat sensor (not shown) to monitor the temperature of the motor 1006. This sensor preferably has a linear 10.0 mV/0 C scale factor. If, during shredding, the motor temperature rises above 80 degrees Celsius, the motor controller preferably is configured to shut down the motor to avoid overheating. Once the motor temperature drops below 45 degrees Celsius, the motor may be reactivated.

Since operation of the shredder motor 1006 in a continuous and/or extended manner for a long period of time has the potential to generate heat, in some embodiments of the CPA 102 according to the system and method 1 of the present invention, the CPA 102 includes a fan (not shown) to create forced air cooling within the CPA housing 801. When a fan is included with the CPA 102, the fan preferably begins to run once coupon shredding begins and stops after a designated period of inactivity.

In the preferred embodiment of the CPA 102 according to the system and method 1 of the present invention, the CPA controller board 901 should support a minimum of 1 GB of removable flash memory. The flash memory preferably used to hold the initial CPA application software (as further discussed below), the retailer's store-specific configuration information and any possible future updates to the same.

In the preferred embodiment, the CPA 102 is controlled by a software application residing in the flash memory as described above. The CPA software preferably is programmed using a Linux-embedded compatible programming language. There are two main components to the CPA software: one component controls the hardware functions associated with running the CPA 102, while the second component handles coupon verification and redemption processes and data and associated communications with the retailer's POS system and with the data center 100.

The functionality of these components can be broadly summarized as follows:

CPA Software Coupon Data Functions Overview
 a. Acts as a repository for the local copy of the coupon registry 105
 b. Accepts transaction related data from the retailer's POS controller 107
 c. Performs first two stages of coupon verification and validation during redemption—ensuring that the presented coupon is in the registry 105, and ensure that all of the coupon's redemption requirements have been satisfied
 d. Saves transaction log ("TLOG") data
 e. Accepts and decodes redeemed coupon barcode data when scanned by the CPA 102
 f. Performs the third stage of coupon validation by checking the redeemed coupons against the previously stored redeemed coupon transaction data
 g. Instructs the coupon shredder assembly to activate and destroy all valid redeemed coupons processed by the CPA 102
 h. Sends all coupon transaction data to the data center 100
 i. Properly shuts itself down when commanded.

CPA Software Hardware Functions Overview
 a. Senses when a coupon has been successfully destroyed/shredded
 b. Senses when a coupon is jammed
 c. Controls the beeper 1004
 d. Controls shredder motor 1006
 e. Controls network the communications/connection hardware 1002

In the preferred embodiment of the universal coupon redemption system and method 1 of the present invention, the CPA 102 captures all product purchase transaction data in order to validate coupons surrendered for redemption, as discussed above. This transaction record data (the transaction log, or "TLOG" data) is communicated to the CPA 102 by the retailer's POS system (though a POS-CPA Interface Application, as further discussed below). The TLOG data allows the CPA 102 to properly verify that all of the coupons' requirements have been satisfied during the product purchase transaction for which they were surrendered, as discussed above.

In the preferred embodiment of the universal coupon redemption system and method 1 of the present invention, the CPA 102 is further configured with internal web server software, also stored on the flash memory, that provides a graphical user interface (GUI) over a network to allow authorized users to check the paper coupons held in the queue (those coupons that have not yet been matched with paper coupons that have been processed and destroyed by the CPA 102) and identify if there are any problems with the redemption process. Access to the CPA 102 GUI preferably is password protected.

In addition to the components discussed above, the universal coupon redemption system and method 1 of the present invention also comprises, in the preferred embodiment, a POS-CPA Interface Application. The POS-CPA Interface Application preferably resides on the retailer's POS controller 107 and functions to send and receive product and coupon transaction-related data to and from the CPA 102.

Since there are many diverse POS systems currently in use in the market place, the POS-CPA Interface Application is different for each participating retailer. However, all versions of the POS-CPA Interface Application are included within the scope of this disclosure, and it will be appreciated that the POS-CPA Interface Application may be customized to operate with particular POS systems without departing from the spirit of the instant invention.

At a minimum, the POS-CPA Interface Application will include, in the preferred embodiment, functionality to permit the following data transfers:

POS Controller 107 to CPA 102
 a. Current transaction log (TLOG) data which includes a listing of all purchased items and costs.
 b. All coupon barcode information scanned in lane at the POS terminal 108 by the cashier.

CPA 102 to POS Controller 107
Coupon validation statuses that can be any of the following:

| Message | Definition |
| --- | --- |
| "Valid Coupon" | Coupon accepted |
| "Check Coupon - It is not on file" | Coupon was not located in the local copy of the registry 105. |
| "Duplicate Coupon" | Coupon already used this transaction. |
| "Required Item(s) not purchased" | Redemption requirements not satisfied. |
| "Missing required data" | Missing valid date, clerk number, etc. |

Those skilled in the art will recognize how the POS-CPA Interface Application may be programmed for particular POS systems in order to achieve the functionality discussed above. All such customizations of the POS-CPA Interface Application that provide the preceding functionality therefore are included within the scope of the present disclosure.

As discussed above, there are numerous advantages of the universal coupon redemption system and method 1 of the present invention. First, system and method 1 of the present invention provides transparency of coupon redemption transactions by recording an audit trail for each coupon redemption transaction and reporting the applicable coupon redemption transactions including their audit trails to both manufacturers and retailers.

The coupon transaction data comprising the audit trail, in the preferred embodiment of the present invention, includes the transaction date, retailer number, retailer's store number and the store transaction number. It should be noted, as previously discussed above, that regardless of the means of distribution the "one coupon per purchase" rule is applied to all coupons redeemed using the coupon redemption system of the present invention.

An additional advantage of the universal coupon redemption system and method 1 of the present invention is the elimination of shipment of paper coupons to clearinghouses and other outside operations, thereby saving costs. Shipment of paper coupons can be eliminated because the coupon redemption system and method 1 of the present invention captures and reports the source of the coupon transaction, as discussed above. Moreover, in the case of a paper coupon, the redeemed paper coupon is destroyed before the coupon redemption transaction is released to the manufacturer for reimbursement to the retailer. This provides an additional level of security and fraud protection.

It also will be appreciated by those skilled in the art that the coupon redemption system and method 1 of the present invention may be readily integrated into both new and existing POS systems, including self-checkout systems, typically at a very modest cost.

Lastly, in one embodiment of the universal coupon redemption system and method 1 of the present invention, paper and electronic coupons may be identified in the coupon registry 105 by the manufacturer's ID and the manufacturer's coupon issue number associated with such coupons. This is the least amount of identifying data necessary to uniquely identify a coupon, and relying on this minimum amount of information greatly simplifies use of the otherwise complex GS1 DataBar barcode.

That is, rather than following the industry trend of making coupon bar codes more and more complex in order to contain more and more information about the coupon and the coupon's redemption requirements, one embodiment of the universal coupon redemption system and method 1 of the of the present invention takes the opposite approach—it moves the encoded coupon redemption requirements off of the face of the coupon and incorporates them into the CPA 102. By moving coupon validation to the CPA 102, counterfeit coupons cannot be validated or redeemed, thereby addressing one of the major causes of coupon fraud.

In this manner, as shown in FIG. 3, the only encoded identifying data that needs to appear on the face of the coupon is the manufacturer's ID (identification number) and the manufacturer's coupon issue number. Thus, because the combined manufacturer's ID and manufacturer's coupon issue number (collectively referred to herein as the "minimum coupon code" or the "minimum coupon identifying code") generally will not exceed 18 digits and, in most cases, will be only 15-16 digits, the barcode representation of this designation can be simply represented on the coupon in a minimal amount of space.

In this embodiment of the universal coupon redemption system and method 1 of the present invention, the system and method 1 operates as described above, with the exception that the registry 105 stores the minimum coupon code along with the coupon's redemption requirements and the CPA 102 is configured to recognize and decode the minimum coupon code on the coupon and communicate with the data center 100 and POS system appropriately.

From the foregoing, it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

In the present disclosure, the words "a" or "an" are to be taken to include both the singular and the plural. Conversely, any reference to plural items shall, where appropriate, include the singular.

All patents referred to herein, are hereby incorporated herein by reference, whether or not specifically done so within the text of this disclosure.

What is claimed is:

1. A method, performed by a coupon processing appliance having a processor, a memory, a laser barcode scanner, a network interface, and a coupon destruction device, for redeeming coupons, the method comprising the steps of:
storing, by the processor, in the memory of the coupon processing appliance, a local copy of an electronic database of registered coupons received from a server, each registered coupon having at least one redemption requirement;
receiving, by the processor, a transaction log for a product purchase transaction from a point of sale system;
receiving, by the processor, identifying information about a surrendered coupon presented for redemption from the point of sale system;
matching, by the processor, the surrendered coupon to a corresponding coupon in the local copy of the electronic database of registered coupons;
checking, by the processor, whether the surrendered coupon previously has been redeemed in the product purchase transaction;
identifying, by the processor, the at least one redemption requirement for the corresponding coupon;
analyzing, by the processor, the transaction log to confirm that the at least one redemption requirement for the corresponding coupon has been satisfied during the product purchase transaction;
flagging, by the processor, that the surrendered coupon has been used during the product purchase transaction so that a duplicate copy of the surrendered coupon cannot be reused during the product purchase transaction;
matching, by the processor, the surrendered coupon with the product purchase transaction;
instructing, by the processor, the coupon destruction device to destroy the surrendered coupon after matching the surrendered coupon with the product purchase transaction;
sending, by the processor, the transaction log to the server in response to the surrendered coupon having been matched to the product purchase transaction and destroyed by the coupon destruction device; and
instructing, by the processor, the server to authorize reimbursement to a redeeming retailer of the surrendered coupon from an issuer of the surrendered coupon for an amount of the surrendered coupon in response to the surrendered coupon having been matched to the product purchase transaction and destroyed by the coupon destruction device.

2. The method of claim 1 wherein the coupon processing appliance communicates with the server through the network interface over a wide area network.

3. The method of claim 1 wherein the coupon processing appliance communicates with the point of sale system through the network interface over a local area network.

4. The method of claim 1 wherein the local copy of the electronic database of registered coupons stored in the memory of the coupon processing appliance is automatically downloaded from the server on a regular basis.

5. The method of claim 1 wherein the coupon destruction device comprises a shredder.

6. The method of claim 1 further comprising the step of communicating, by the processor, a price adjustment for the product purchase transaction to the point of sale system.

7. The method of claim 1 further comprising the step of monitoring, by the processor, a current sense signal of the coupon destruction device to confirm when the surrendered coupon has been destroyed.

8. The method of claim 1 wherein the registered coupons are identified by a minimum coupon code, wherein the minimum coupon code comprises a manufacturer's identification number and a manufacturer's coupon issue number.

9. A universal coupon redemption system, comprising:
a processor configured to:
store a local copy of an electronic database of registered coupons received from a server, each registered coupon having at least one redemption requirement;
receive a transaction log for a product purchase transaction from a point of sale system;
receive identifying information about a surrendered coupon presented for redemption from the point of sale system;
match the surrendered coupon to a corresponding coupon in the local copy of the electronic database of registered coupons;
check whether the surrendered coupon previously has been redeemed in the product purchase transaction;
identify the at least one redemption requirement for the corresponding coupon;
analyze the transaction log to confirm that the at least one redemption requirement for the corresponding coupon has been satisfied during the product purchase transaction;
flag that the surrendered coupon has been used during the product purchase transaction so that a duplicate copy of the surrendered coupon cannot be reused during the product purchase transaction;
match the surrendered coupon with the product purchase transaction;
instruct a coupon destruction device to destroy the surrendered coupon after matching the surrendered coupon with the product purchase transaction;
send the transaction log to the server in response to the surrendered coupon having been matched to the product purchase transaction and destroyed by the coupon destruction device; and
instruct the server authorize reimbursement to a redeeming retailer of the surrendered coupon from an issuer of the surrendered coupon for an amount of the surrendered coupon in response to the surrendered coupon having been matched to the product purchase transaction and destroyed by the coupon destruction device.

10. The universal coupon redemption system of claim 9 wherein the processor is further configured to communicate with the server over a wide area network.

11. The universal coupon redemption system of claim 9 wherein the processor is further configured to communicate with the point of sale system over a local area network.

12. The universal coupon redemption system of claim 9 wherein the processor is further configured to download the local copy of the electronic database of registered coupons from the server on a regular basis.

13. The universal coupon redemption system of claim 9 wherein the coupon destruction device comprises a shredder.

14. The universal coupon redemption system of claim 9 wherein the processor is further configured to communicate a price adjustment for the product purchase transaction to the point of sale system.

15. The universal coupon redemption system of claim 9 wherein the processor is further configured to monitor a current sense signal of the coupon destruction device to confirm when the surrendered coupon has been destroyed.

16. The universal coupon redemption system of claim 9 wherein the registered coupons are identified by a minimum coupon code, wherein the minimum coupon code comprises a manufacturer's identification number and a manufacturer's coupon issue number.

* * * * *

UNITED STATES PATENT AND TRADEMARK OFFICE
CERTIFICATE OF CORRECTION

PATENT NO.         : 8,533,045 B1                                              Page 1 of 1
APPLICATION NO.    : 12/907870
DATED              : September 10, 2013
INVENTOR(S)        : Cunningham et al.

It is certified that error appears in the above-identified patent and that said Letters Patent is hereby corrected as shown below:

On the title page, Item (63) should be deleted and replaced with the following new Item (63):

(63) Continuation-in-part of application No. 10/838,896, filed on May 4, 2004, now Pat. No. 7,877,288, and a continuation-in-part of application No. 11/202,768, filed on August 12, 2005, now Pat. No. 7,877,289, and a continuation-in-part of application No. 11/765,026, filed on June 19, 2007, now Pat. No. 8,090,615, which is a continuation-in-part of application No. 11/202,768, filed on August 12, 2005, now Pat. No. 7,877,289.

Signed and Sealed this
Ninth Day of February, 2016

Michelle K. Lee
*Director of the United States Patent and Trademark Office*